United States Patent [19]

Sugahara et al.

[11] 3,958,681

[45] May 25, 1976

[54] MEANS OF SUPPLYING CONTROL AIR TO AN INFLATABLE MEMBER OF A TORQUE CONTROL MEANS

[75] Inventors: Eisuke Sugahara, Tokyo; Shigeo Uehara, Kawaguchi; Yoshihiro Sugizaki, Urawa; Yasuo Uchida, Tokyo, all of Japan

[73] Assignee: Nippon Piston Ring Co., Ltd., Tokyo, Japan

[22] Filed: Nov. 8, 1974

[21] Appl. No.: 522,174

[30] Foreign Application Priority Data
Nov. 8, 1973    Japan.............................. 48-124983

[52] U.S. Cl. .............................. 192/88 B; 192/54; 64/11 P
[51] Int. Cl.² ........................................ F16D 25/04
[58] Field of Search................... 192/88 B, 56 F, 54

[56] References Cited
UNITED STATES PATENTS

| 2,277,554 | 3/1942 | McCoy | 192/56 F |
|---|---|---|---|
| 2,781,871 | 2/1957 | Altekruse | 192/56 F |
| 3,327,815 | 6/1967 | Croswhite | 192/56 F |
| 3,719,259 | 3/1973 | Burcz et al. | 192/54 |

*Primary Examiner*—Benjamin W. Wyche
*Attorney, Agent, or Firm*—Sughrue, Rothwell, Mion, Zinn & Macpeak

[57] ABSTRACT

A control system is disclosed for supplying air to a torque control device of the type having a first and a second rotary member, a drum carried by one of said rotary members, a friction shoe carried on an inflatable member affixed to the other rotary member and adapted to expand so as to press the friction shoe onto the drum to transmit torque between the first and second rotary members. The control air is supplied to the inflatable member in accordance with the slip taking place between the two friction members, whereby the slip is ceased to protect the friction members from the heat which would otherwise generate and accumulate during the slip.

3 Claims, 6 Drawing Figures

MEANS OF SUPPLYING CONTROL AIR TO AN INFLATABLE MEMBER OF A TORQUE CONTROL MEANS

BACKGROUND OF THE INVENTION

1. Field of the Invention

The present invention relates to a means for supplying control air to an inflatable member of a torque control means of a type having first and second rotary members rotatable in optional friction engagement with each other and an inflatable member adapted to control the friction engagement upon being supplied with the control air.

2. Description of the Prior Art

In known torque control means of above-mentioned type, for example, air clutches or air brakes, one of the rotary members carries a drum while the other carries a friction shoe through the inflatable member, so that the friction shoe may be pressed onto the drum for friction engagement therewith upon inflation of the inflatable member. With such arrangements, the friction members are likely to be heated by the heat generated during continued slip between those members, which takes place, for example, when the torque transmitted is excessive for the pressing force exerted by the inflatable member. As a result of this overheating the friction members are burned out or deteriorated resulting in a rapid failure in the whole assembly.

SUMMARY OF THE INVENTION

It is therefore an object of the present invention to provide means for supplying control air to the inflatable member which is capable of increasing or decreasing the air pressure so as to control the pressing force exerted by inflatable members thereby preventing the eventual slip.

It is another object of the invention to provide a simple and reliable means capable of performing the above function.

According to the invention, there is provided means for supplying control air to an inflatable member of a torque control means of a type having first and second rotary member, a friction shoe carried on an inflatable members attached to a housing on one of said rotary members, a drum carried by the other rotary member and being adapted to frictionally engage said friction shoe, the friction engagement being effected by inflation of said inflatable member. The control air supplying means comprises a signal transmitting ring mounted on said one rotary member for rotation therewith and having a signal air transmitting port; a stationary signal receiving ring surrounding said signal transmitting ring and having a signal air receiving port, said transmitting and receiving ports being intercommunicated by a limited space between said two rings; a deviation detecting means carried by said housing and being adapted to detect a deviation of the friction shoe with respect to the housing; and a means for controlling the pressure of said control air in accordance with the deviation detected by the deviation detecting means.

Since the slip between the friction members is accompanied by deformation of the inflatable member, the slip can be detected as a deviation of the friction shoe with respect to the housing. It is to be understood that by controlling the pressure of the air supplied to the inflatable member in such a manner that the pressure is increased as the deviation is detected, the force exerted by the inflatable member to press the friction shoe onto the drum can be increased, whereby the slip is eliminated even for the greater torque which brought about the detected slip.

The above and other objects and features of the invention will appear more fully hereinafter from a consideration of the following description taken in connection with the accompanying drawings which show by way of examples some embodiments of the present invention.

DETAILED DESCRIPTION OF THE PREFERRED EMBODIMENTS

Figure 1:
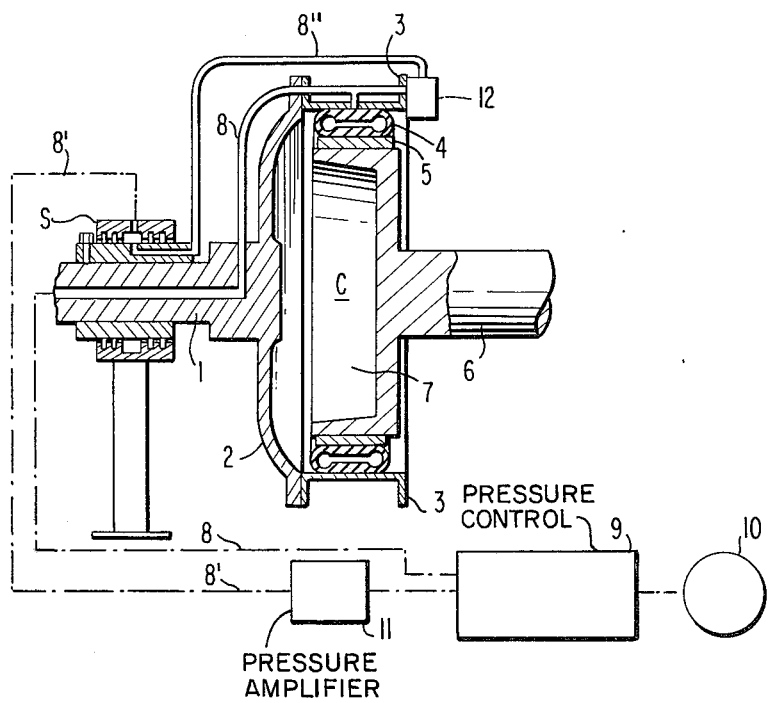
FIG. 1 is a longitudinal sectional view of an air clutch incorporating the control air supplying means of the present invention.

FIG. 1 shows in section an air clutch C in which an air supplying means of the present invention is incorporated. The air clutch has a housing 3 which is fixed to a flange 2 of a driven shaft 1. An inflatable member 4 is attached to the inner wall of the housing 3 and is adapted to be inflated upon being supplied with a pressurized fluid, such as air. The inflatable member 4 carries along its circumferential wall a friction shoe 5 which surrounds a driving drum 7 on a driving shaft 6.

The inflatable member 4 is connected via a control means 9 to a pressurized fluid source 10 by a conduit means 8. Control means 9 may be any standard, commercially available pressure regulator which will regulate the pressure supplied from pressurized fluid source 10 to inflatable member 4. A deviation detector 12 is mounted on the housing 3 and is connected to the source 10 through another conduit means 8'.

Figure 2:
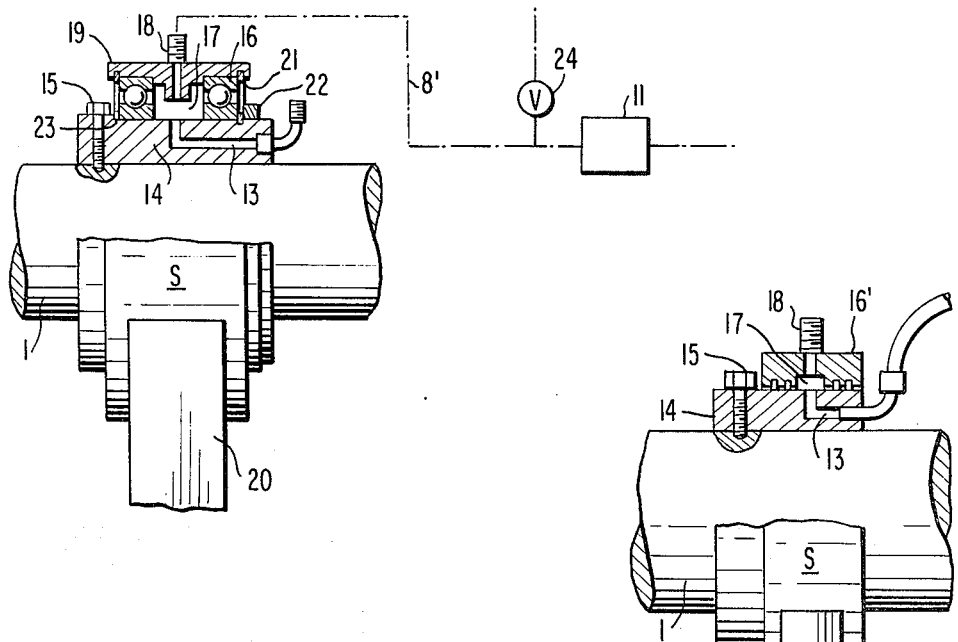
FIG. 2 is an enlarged partial sectional view of a portion of a first embodiment of the present invention.

The control air supplying means S embodying the present invention comprises, as shown in FIG. 2, a transmitting ring 14 fixed to the drive shaft 1 by a bolt 15. The transmitting ring 14 has a transmitting air bore 13 which is connected to the deviation detector 12. A limited space 17 is defined between a signal receiving ring 19 and the transmitting ring 14 by a pair of axially spaced ball bearings 16.

The signal receiving ring 19 has a signal air receiving bore 18 and is fixed to a stationary portion (not shown) of the clutch assembly through a column 20. The signal air receiving bore 18 is connected to a pressure amplifier 11 via conduit 8' which is connected to the control means 9. Pressure amplifier 11 may be any known means which amplifies the pressure signal from the signal air receiving bore 18 before it enters control means 9. The transmitting air bore 13 is, as aforementioned, connected to the deviation detecting means 12, through conduit means 8'. The ball bearings are secured to the signal receiving ring 19 by means of a pair of snap rings 21 and are clamped between a shoulder 23 formed on the transmitting ring 14 near the bolt 15 and a clamp ring 22.

When the signal air is no longer delivered from the deviation detector 12, the air confined within the system between the deviation detector 12 and the amplifier 11 is allowed to escape through a slight gap provided by the ball bearings 16 so that the air pressure in the space 17 cannot fall promptly in spite of the cessation of the signal from the deviation detector 12, resulting in a certain time lag and possible errors in responding to the detected deviation.

In order to avoid this problem, it is advantageous and therefore preferable to connect a bleed pipe having a restriction valve 24 to the conduit means 8' in order to assure the prompt pressure reduction in the space 17. The restriction valve 24 is preferably adjustable to increase or decrease the bleed air to optimize the pressure amplitude in the space 17 for the desired control, otherwise it would necessarily occur that the signal air pressure applied to the amplifier 11 is unduly minimized due to an excessive bleeding.

Figure 3:
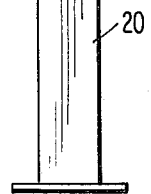
FIG. 3 is a partial sectional view of a second embodiment of the present invention.
Figure 4:
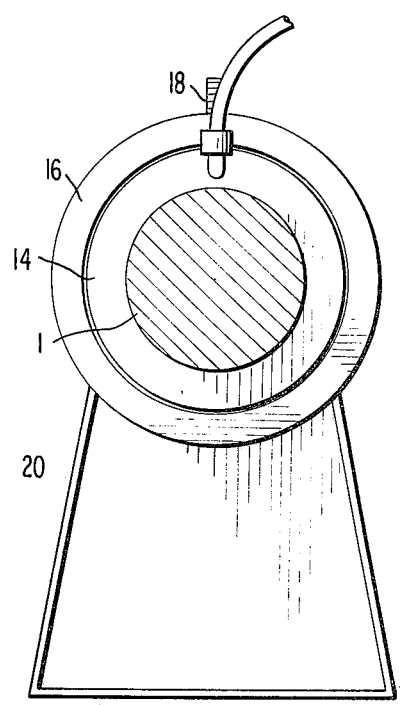
FIG. 4 is an elevation of the second embodiment shown in FIG. 3.

FIGS. 3 and 4 show in sections another embodiment of the invention. This embodiment differs from the first embodiment only in that a labyrinth seal 16' is substituted for the ball bearings 16. It will be understood that the labyrinth seal 16' restricts the air escaping from the space 17 so as to optimize the pressure amplitude which is input to the amplifier 11.

Figure 5:
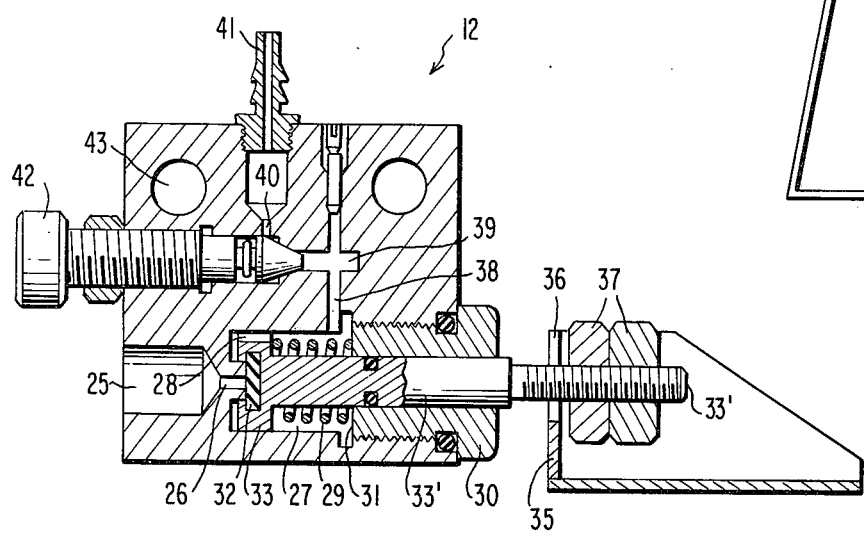
FIG. 5 is a longitudinal sectional view of a deviation detecting device according to the present invention.
Figure 6:
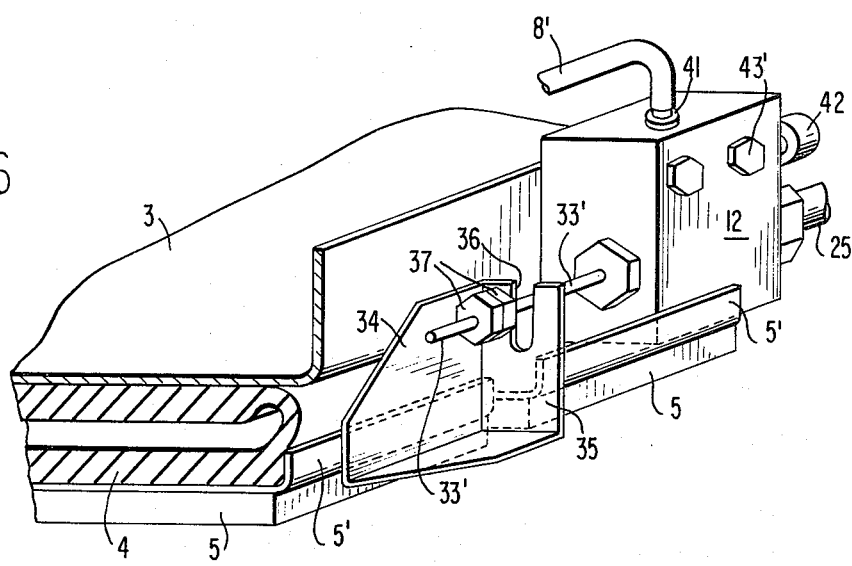
FIG. 6 is a perspective view showing a manner in which the deviation detecting means of FIG. 5 is mounted on a housing of the air clutch.

One form of the deviation detecting means 12 which is used in combination with the system of the invention is shown in detail in FIG. 5. The deviation detecting means is formed to have almost rectangular section as a whole, and has an air inlet port 25 which communicates with the pressurized fluid source 10 with a chamber 27 through a small bore 26. A piston 33 having an air passage which intercommunicates both sides of the piston is accommodated within the chamber 27. The piston 33 is biased by a compression spring 29 which acts between a spring retainer 31 of a nut 30 and the piston itself so as to shut the small bore 26 by a packing 32 which is provided in the piston at its one end remote from the nut 30. A piston rod 33' extends through the nut 30 out of the deviation detecting means 12, and goes through a slot 36 formed in the side wall 35 of an attaching plate 34 which is fixed to a corresponding attaching plate 5' on the friction shoe 5 (see FIG. 6).

A double nut means are screwed onto the threaded end of the piston rod 33' thereby making it possible to adjust the stroke or a lost motion of the piston 33. The chamber 27 is connected to the control air supplying means S, through bores 38, 39 and 40, and through an outlet port 41. An adjustable air restricting needle valve 42 is positioned to adjust or regulate the flow of the air between the chamber 27 and the control air supplying means S.

The assembled deviation detecting means is adapted to be mounted on the housing 3 of the air clutch (or an air brake when the means of the invention is used in combination with an air brake) by means of a bolt 43' which goes through the bore 43, in such a manner that the change in the position (i.e., what is referred to as deviation in this disclosure) of the friction shoe 5 with respect to the housing 3, which change results from the deformation of the member 4, can be sensed as a movement of the piston 33.

In operation, when a greater torque is transmitted from the driving or input drum 7 through the friction shoe 5 to the inflatable member 4, the member 4 is forced to deform causing a deviation or circumferential shifting of the friction shoe 5 with respect to the housing 3. This deviation is transferred to the piston 33 through attaching plates 5', 34 and to the piston rod 33' thereby moving the piston 33 against the spring 29. This movement of the piston clears the packing 32 from the small bore 26 allowing the air from the source 10 to enter the chamber 27. The pressurized air thus passes into the chamber 27 then reaches the control air supplying means S, through the bores 38, 39 and 40 and the outlet port 41, being regulated by the needle valve 42.

The pressurized air is then applied to the control means 9 upon being amplified by the amplifier 11, through the conduit means 8'. The control means is then actuated to control the pressure of air from the source 10 and to let the thus controlled air go into the inflatable member 4 to pressurize and inflate the latter rapidly, thereby pressing the friction shoe 5 more tightly against the drum 7 so as to stop the slip between the two members.

It is to be appreciated that according to the present invention, the pressing force exerted on the friction shoe toward the driving drum can be conveniently increased or decreased in response to the change in the torque being transmitted thereby preventing the unfavorable slip between two members, by employing relatively simple construction.

It is further understood by those skilled in the art that the foregoing description is of a preferred embodiment and that various changes and modifications may be made in the invention without departing from the spirit and scope thereof.

What is claimed is:

1. In a device for selectively transmitting torque between first and second rotatable members of the type having a drum carried by said first rotatable member, a friction shoe carried by an inflatable member attached to a housing fixed to the second rotatable member, said friction shoe being engageable with said drum upon inflation of said inflatable member by a pressurized fluid and a controllable source of pressurized fluid, the improved pressurized fluid supply system comprising:

a. a signal transmitting ring (14) attached to said second rotatable member so as to rotate therewith, said signal transmitting ring having a transmitting air bore (13) therethrough;

b. a stationary signal receiving ring (19) surrounding said signal transmitting ring so as to define a space therebetween (17), and rigidly attached to a stationary support, said signal receiving ring having signal air receiving bore (18) therethrough communicating with said space;

c. deviation detection means (12) to detect the relative circumferential shifting between the housing and the friction shoe when said shoe is engaged with said drum, and to control the pressure of the fluid within said inflatable member in direct proportion to the amount of deviation detected, said detection means having an inlet port (25) and an outlet port (41);

d. first conduit means (8) connecting said controllable source of pressurized fluid to said deviation detection means inlet port (25) and said inflatable member (14);

e. second conduit means (8") connecting said deviation detection means outlet port (41) with said signal transmitting ring transmitting air bore (13); and f. third conduit means (8') connecting said signal air receiving bore (18) with said controllable source of pressurized fluid.

2. The improved pressurized fluid supply system of claim 1, further comprising pressure amplifier means in said third conduit.

3. The improved pressurized fluid supply system of claim 1, wherein said deviation detection means comprises:
 a. a casing attached to said housing (3), said casing having a chamber (27) communicating with said inlet port (25), a first bore (38) communicating with said chamber, a second bore (39) communicating with said first bore, and a third bore (40) communicating with said outlet port (41);
 b. first valve means (33) disposed in said chamber, said valve having a stem portion extending externally of said casing;
 c. means to attach said valve stem portion to said friction shoe;
 d. second valve means (42) disposed in said casing to regulate the fluid flow through said second bore; and
 e. means to bias (29) said first valve means to normally prevent communication between said chamber and said inlet port.

* * * * *